US009633595B2

(12) United States Patent
Hwang et al.

(10) Patent No.: US 9,633,595 B2
(45) Date of Patent: Apr. 25, 2017

(54) DISPLAY APPARATUS AND METHOD OF DRIVING DISPLAY PANEL USING THE SAME

(71) Applicant: Samsung Display Co., LTD., Yongin, Gyeonggi-Do (KR)

(72) Inventors: Hyun-Sik Hwang, Hwaseong-si (KR); Bong-Im Park, Asan-si (KR); Jung-Deok Seo, Cheonan-si (KR); Byung-Kook Sim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 116 days.

(21) Appl. No.: 14/750,518

(22) Filed: Jun. 25, 2015

(65) Prior Publication Data

US 2016/0203753 A1 Jul. 14, 2016

(30) Foreign Application Priority Data

Jan. 13, 2015 (KR) ........................ 10-2015-0006383

(51) Int. Cl.
*G06F 3/038* (2013.01)
*G09G 3/20* (2006.01)

(52) U.S. Cl.
CPC ... *G09G 3/2092* (2013.01); *G09G 2300/0426* (2013.01); *G09G 2300/0842* (2013.01);
(Continued)

(58) Field of Classification Search
CPC ............... G09G 3/2092; G09G 3/3677; G09G 2300/0842; G09G 2300/0876;
(Continued)

(56) References Cited

U.S. PATENT DOCUMENTS

| | | | |
|---|---|---|---|
| 6,496,238 | B1 | 12/2002 | Greene et al. |
| 2007/0152947 | A1 | 7/2007 | Tanaka et al. |

(Continued)

FOREIGN PATENT DOCUMENTS

| | | | |
|---|---|---|---|
| CN | 203519983 | U | 4/2014 |
| KR | 1020130096536 | A | 8/2013 |

(Continued)

OTHER PUBLICATIONS

Extended European Search Report for Application No. 15187264.5-1903 dated Nov. 4, 2015.

*Primary Examiner* — Andrew Sasinowski
*Assistant Examiner* — Kuo Woo
(74) *Attorney, Agent, or Firm* — Cantor Colburn LLP

(57) ABSTRACT

A display apparatus includes a display panel, a gate driver and a data driver. The display panel includes gate lines, data lines and pixels electrically connected to the gate lines and the data lines. The gate driver is disposed adjacent to a first side of the display panel, and outputs a gate signal to the gate line. The data driver is disposed adjacent to the first side of the display panel, and outputs a data voltage to the data line. A gate signal applied to a position having a low resistance-capacitance ("RC") delay of the gate line has a kickback slice greater than a kickback slice of a gate signal applied to a position having a high RC delay of the gate line. The kickback slice is defined as a portion having a level lower than a gate-on voltage level in a gate pulse of the gate signal.

19 Claims, 13 Drawing Sheets

(52) U.S. Cl.
CPC ............... *G09G 2300/0876* (2013.01); *G09G 2310/0262* (2013.01); *G09G 2310/0281* (2013.01); *G09G 2310/08* (2013.01); *G09G 2320/0223* (2013.01); *G09G 2330/028* (2013.01)

(58) Field of Classification Search
CPC ... G09G 2310/0262; G09G 2310/0278; G09G 2330/028
USPC .......................................................... 345/212
See application file for complete search history.

(56) References Cited

U.S. PATENT DOCUMENTS

| | | | | |
|---|---|---|---|---|
| 2010/0053056 | A1* | 3/2010 | Lee ....................... | G02F 1/1345 345/94 |
| 2011/0074746 | A1* | 3/2011 | Chang ...................... | G09G 3/20 345/204 |
| 2014/0253531 | A1* | 9/2014 | Lee ...................... | G09G 3/3677 345/212 |
| 2014/0333592 | A1 | 11/2014 | Cho et al. | |
| 2014/0375922 | A1* | 12/2014 | Park .................. | G02F 1/136286 349/46 |

FOREIGN PATENT DOCUMENTS

| | | | |
|---|---|---|---|
| KR | 1020140022272 | A | 2/2014 |
| KR | 1020140078231 | A | 6/2014 |

* cited by examiner

DISPLAY APPARATUS AND METHOD OF DRIVING DISPLAY PANEL USING THE SAME

This application claims priority to Korean Patent Application No. 10-2015-0006383, filed on Jan. 13, 2015, and all the benefits accruing therefrom under 35 U.S.C. §119, the content of which in its entirety is herein incorporated by reference.

BACKGROUND

1. Field

Exemplary embodiments of the invention relate to a display apparatus and a method of driving a display panel using the display apparatus. More particularly exemplary embodiments of the invention relate to a display apparatus having improved display quality and a method of driving a display panel using the display apparatus.

2. Description of the Related Art

A display apparatus typically includes a display panel and a display panel driver. The display panel includes a gate line and a data line. The display panel driver includes a gate driver and a data driver.

In a display apparatus, where the gate driver and the data driver are disposed adjacent to a side of the display panel, the gate and data drivers may be disposed adjacent to only one side among four sides of the display panel so that a width of a bezel of the display apparatus may be reduced.

SUMMARY

In a display apparatus, where the gate and data drivers may be disposed adjacent to only one side among four sides of the display panel, resistance-capacitance ("RC") delay of the gate signal applied to the display panel may vary according to a position of the display panel. Thus, a charging rate, luminance, a degree of afterimage and a degree of flicker may vary according to the position on the display panel so that the display quality of the display panel may be deteriorated.

Exemplary embodiments of the invention provide a display apparatus having improved display quality of a display panel.

Exemplary embodiments of the invention also provide a method of driving the display apparatus using the display apparatus.

In an exemplary embodiment of a display apparatus according to the invention, the display apparatus includes a display panel, a gate driver and a data driver. In such an embodiment, the display panel includes a plurality of gate lines, a plurality of data lines and a plurality of pixels electrically connected to the gate lines and the data lines. In such an embodiment, the display panel displays an image. In such an embodiment, the gate driver is disposed adjacent to a first side of the display panel, and outputs a gate signal to the gate line. In such an embodiment, the data driver is disposed adjacent to the first side of the display panel, and outputs a data voltage to the data line. In such an embodiment, a gate signal applied to a position having a low resistance-capacitance ("RC") delay of the gate line has a kickback slice greater than a kickback slice of a gate signal applied to a position having a high RC delay of the gate line. In such an embodiment, the kickback slice is defined as a portion having a level lower than a gate-on voltage level in a gate pulse of the gate signal.

In an exemplary embodiment, the gate line may include a horizontal gate line part and a vertical gate line part connecting the horizontal gate line part to the gate driver.

In an exemplary embodiment, the gate signal applied to the horizontal gate line part which is disposed closer to the gate driver in the display panel may have the kickback slice greater than the kickback slice of the gate signal applied to the horizontal gate line part which is farther from the gate driver.

In an exemplary embodiment, the gate lines may include: gate lines of a first gate line group extending in an inclined direction from the first side of the display panel, where the inclined direction is a direction different from a vertical direction and a horizontal direction, the gate lines of the first gate line group are sequentially disposed from a first end of the first side to a second end of the first side, the gate lines of the first gate line group may cover a first area of the display panel, and the gate lines of the first gate line is connected to the gate driver; gate lines of a second gate line group extending in the inclined direction from a second side of the display panel, where the second side is connected to the first side, and the gate lines of the second gate line group cover a second area of the display panel which is not covered by the gate lines of the first gate line group; and gate lines of a third gate line group connecting the gate lines of the second gate line group to the gate driver.

In an exemplary embodiment, the gate lines of the first gate line group may include gate lines extending from the first side to a third side, which is opposite to the first side, and gate lines extending from the first side to a fourth side, which is opposite to the second side and connected to the first end of the first side. In such an embodiment, the kickback slices of the gate signals applied to the first area through the gate lines extending from the first side to the fourth side may decrease according to positions of ends the gate lines extending from the first side to the fourth side on the first side from the first end to the second end.

In an exemplary embodiment, the second side may be connected to the second end of the first side, and the kickback slices of the gate signals applied to the second area through the gate lines of the third gate line group and the gate lines of the second gate line group may increase according to positions of ends of the gate lines of the third gate line group on the first side from the first end to the second end.

In an exemplary embodiment, the display apparatus may further include a timing controller which generates a gate clock signal defining a timing of the gate signal and a kickback signal defining the kickback slice and a power voltage generator which generates a compensated gate-on voltage based on the kickback signal, where the compensated gate-on voltage includes a kickback slice component. In such an embodiment, the gate driver may be which generates the gate signal based on the gate clock signal and the compensated gate-on voltage.

In an exemplary embodiment, the data voltage applied to a position having a relatively high RC delay of the gate line may have a relatively great source shift. In such an embodiment, the source shift may be defined as a time interval to delay to output the data voltage, when the data voltage is outputted from the data driver.

In an exemplary embodiment, the gate line may include a horizontal gate line part and a vertical gate line part connecting the horizontal gate line part to the gate driver.

In an exemplary embodiment, the source shift of the data voltage may increase in a horizontal direction of the display panel as a distance of a position, to which the data voltage is applied, from a contact part between the horizontal gate line part and the vertical gate line part increases.

In an exemplary embodiment, the horizontal gate line part may include: an upper horizontal gate line in an upper portion of the display panel adjacent to the gate driver; a middle horizontal gate line in a horizontal central portion of the display panel; and a lower horizontal gate line in a lower portion of the display panel display. In such an embodiment, a contact part between the upper horizontal gate line part and the vertical gate line part may be disposed closer to a first end of the first. In such an embodiment, a contact part between the middle horizontal gate line part and the vertical gate line part may be disposed in a vertical central portion of the display panel extending from a central portion of the first side. In such an embodiment, a contact part between the lower horizontal gate line part and the vertical gate line part may be disposed closer to a second end of the first side.

In an exemplary embodiment, the source shift of the data voltage applied to a first data line of the data lines adjacent to the first end of the first side may increase from the upper portion to the lower portion of the display panel. In such an embodiment, the source shift of the data voltage applied to a central data line of the data lines adjacent to the central portion of the first side may decrease and increase from the upper portion to the lower portion of the display panel. In such an embodiment, the source shift of the data voltage applied to a last data line of the data lines adjacent to the second end of the first side may decrease from the upper portion to the lower portion of the display panel.

In an exemplary embodiment, the gate lines may include: gate lines of a first gate line group extending in an inclined direction from the first side of the display panel, where the inclined direction is a direction different from a vertical direction and a horizontal direction, the gate lines of the first gate line group is sequentially disposed from a first end of the first side to a second end of the first side, the gate lines of the first gate line group cover a first area of the display panel, and the gate lines of the first gate line are connected to the gate driver; gate lines of a second gate line group extending in the inclined direction from a second side of the display panel, wherein the second side is connected to the first side, and the gate lines of the second gate line group cover a second area of the display panel which is not covered by the gate lines of the first gate line group; and gate lines of a third gate line group connecting the gate lines of the second gate line group to the gate driver.

In an exemplary embodiment, the source shifts of the data voltages applied to a data line closer to the first end of the first side of the display panel and passes through only the first area may increase from an upper portion of the display panel to a lower portion of the display panel.

In an exemplary embodiment, the source shifts of the data voltages applied to a data line closer to the second end of the first side of the display panel and passes through the first area and the second area may increase and decrease from an upper portion of the display panel to a lower portion of the display panel.

In an exemplary embodiment of a method of driving a display panel according to the invention, the method includes outputting a gate signal to a gate line using a gate driver, where the gate driver is disposed adjacent to a first side of the display panel, the display panel includes a plurality of the gate lines, a plurality of data lines and a plurality of pixels electrically connected to the gate lines and the data lines; and outputting a data voltage to the data line using a data driver, where the data driver is disposed adjacent to the first side of the display panel. In such an embodiment, the gate signal applied to a position having a low RC delay of the gate line has a kickback slice greater than a kickback slice of the gate signal applied to a position having a high RC delay. In such an embodiment, the kickback slice is defined as a portion having a level lower than a gate-on voltage level in a gate pulse of the gate signal.

In an exemplary embodiment, the gate line may include a horizontal gate line part and a vertical gate line part connecting the horizontal gate line part to the gate driver.

In an exemplary embodiment, the gate signal applied to the horizontal gate line part which is disposed closer to the gate driver in the display panel may have the kickback slice greater than the kickback slice of the gate signal applied to the horizontal gate line part which is farther from the gate driver.

In an exemplary embodiment, the data voltage applied to a position having a relatively high RC delay of the gate line may have a relatively great source shift. The source shift may be defined as a time interval to delay to output the data voltage, when the data voltage is outputted from the data driver.

According to exemplary embodiments of the display apparatus and the method of driving the display panel using the display apparatus, a kickback slice of the gate signal and a source shift of the data voltage are adjusted according to the position thereof on the display panel such that differences of the charging rate, the luminance, the degree of the afterimage and the degree of the flicker may be effectively compensated. Thus, in such embodiment, the display quality of the display apparatus having slim bezel may be improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
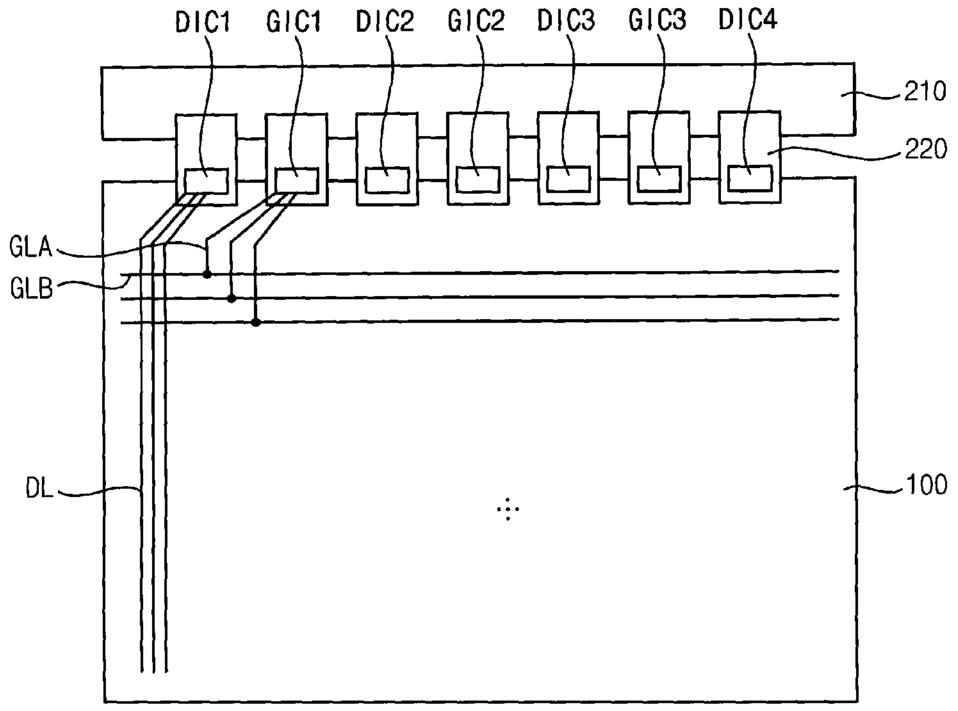
FIG. 1 is a plan view illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiment of the invention will be described in detail with reference to the accompanying drawings.

Figure 2:
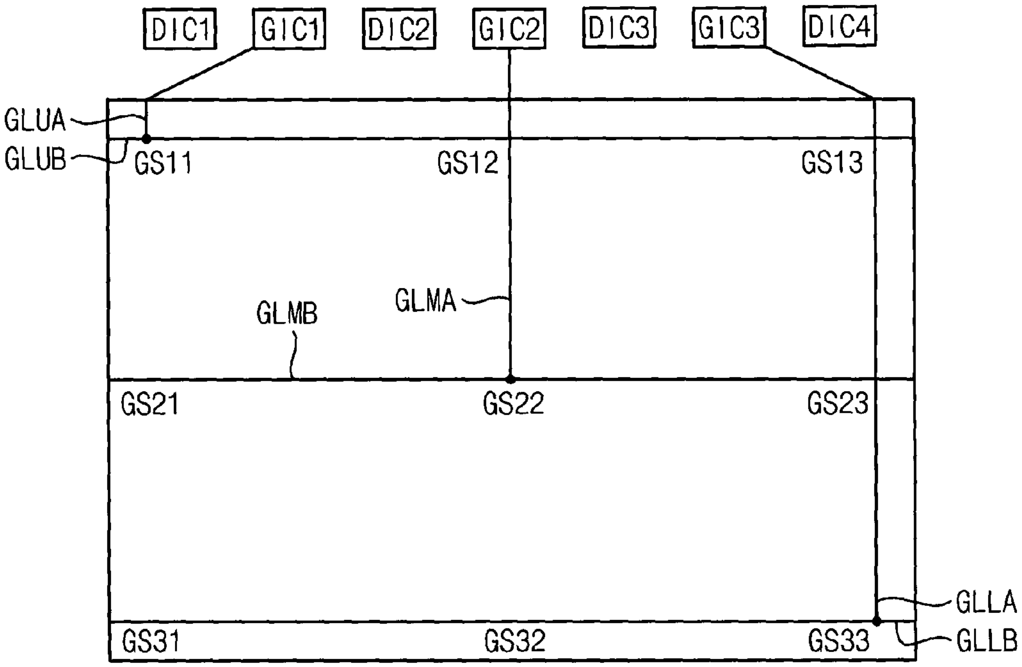
FIG. 2 is a conceptual diagram illustrating a display panel and gate lines on the display panel of FIG. 1.
Figure 3:
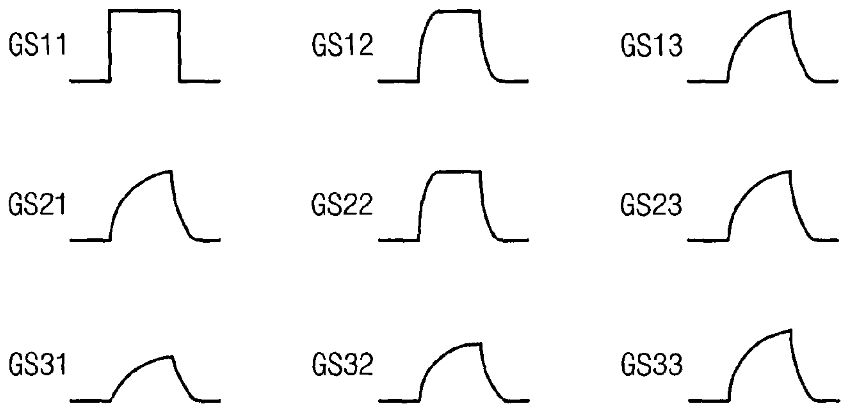
FIG. 3 is a waveform diagram illustrating gate signals according to positions of the display panel of FIG. 2.

FIG. 1 is a plan view illustrating an exemplary embodiment of a display apparatus according to the invention. FIG. 2 is a conceptual diagram illustrating a display panel 100 and gate lines on the display panel 100 of FIG. 1. FIG. 3 is a waveform diagram illustrating gate signals according to positions of the display panel 100 of FIG. 2.

Referring to FIGS. 1 to 3, an exemplary embodiment of the display apparatus includes a display panel 100 and a display panel driver.

The display panel driver includes a gate driver GIC1, GIC2 and GIC3 and a data driver DIC1, DIC2, DIC3 and DIC4. The gate driver GIC1, GIC2 and GIC3 is disposed adjacent to a first side portion (e.g., an upper side portion)

of the display panel 100. The data driver DIC1, DIC2, DIC3 and DIC4 is disposed adjacent to a first side portion (e.g., an upper side portion) of the display panel 100.

The gate driver includes a plurality of gate driving chips GIC1, GIC2 and GIC3. The gate driving chips GIC1, GIC2 and GIC3 may be disposed on a flexible printed circuit board ("FPC") 220. The data driver includes a plurality of data driving chips DIC1, DIC2, DIC3 and DIC4. The data driving chips DIC1, DIC2, DIC3 and DIC4 may be disposed on the flexible printed circuit board 220. The flexible printed circuit board 220 connects the printed circuit board ("PCB") 210 to the display panel 100. In one exemplary embodiment, for example, the printed circuit board 210 may be disposed on a rear surface of the display panel 100 due to bending of the flexible printed circuit board 220.

Alternatively, the gate driver and the data driver may be disposed, e.g., mounted, on a peripheral portion of the display panel 100. Alternatively, the gate driver and the data driver may be integrated on the peripheral portion of the display panel 100.

In one exemplary embodiment, for example, the gate driving chips and the data driving chips are alternately disposed with each other.

Although three gate driving chips and four data driving chips are shown in FIG. 1, the invention is not limited thereto. In such an embodiment, the number of the gate driving chips and the number of the data driving chips may be variously modified.

In an exemplary embodiment, the display panel 100 includes a plurality of gate lines GLA and GLB, a plurality of data lines DL, and a plurality of pixels electrically connected to the gate lines GLA and GLB and the data lines DL.

In such an embodiment, each pixel includes a switching element (not shown), a liquid crystal capacitor (not shown) and a storage capacitor (not shown). The liquid crystal capacitor and the storage capacitor are electrically connected to the switching element. The pixels may be disposed substantially in a matrix form.

In an exemplary embodiment, as shown in FIG. 1, the gate line includes a horizontal gate line part GLB and a vertical gate line part GLA connecting the horizontal gate line part GLB and the gate driver GIC1, GIC2 and GIC3.

In one exemplary embodiment, for example, the horizontal gate line part GLB may extend in a direction crossing the data line DL. The vertical gate line part GLA may extend in a direction substantially parallel to the data line DL.

The number of the vertical gate line parts GLA may be substantially the same as the number of the horizontal gate line parts GLB. The vertical gate line parts GLA may be connected to the horizontal gate line parts GLB with a one-to-one correspondence. A first vertical gate line part may be connected to a first horizontal gate line part to transmit a first gate signal to the first horizontal gate line part. A second vertical gate line part may be connected to a second horizontal gate line part to transmit a second gate signal to the second horizontal gate line part.

Although not shown in figures, the display panel driver may further include a timing controller that controls operations or adjusts timings of the gate driver GIC1, GIC2 and GIC3 and the data driver DIC1, DIC2, DIC3 and DIC4.

In such an embodiment, the timing controller receives input image data and an input control signal from an external apparatus. The input image data may include red image data, green image data and blue image data. The input control signal may include a master clock signal and a data enable signal. The input control signal may further include a vertical synchronizing signal and a horizontal synchronizing signal.

The timing controller generates a first control signal, a second control signal and a data signal based on the input image data and the input control signal.

The timing controller generates the first control signal for controlling an operation of the gate driver GIC1, GIC2 and GIC3 based on the input control signal, and outputs the first control signal to the gate driver GIC1, GIC2 and GIC3. The first control signal may include a vertical start signal and a gate clock signal.

The timing controller may generate the second control signal for controlling an operation of the data driver DIC1, DIC2, DIC3 and DIC4 based on the input control signal, and output the second control signal to the data driver DIC1, DIC2, DIC3 and DIC4. The second control signal may include a horizontal start signal and a load signal.

The timing controller generates the data signal based on the input image data. The timing controller outputs the data signal to the data driver DIC1, DIC2, DIC3 and DIC4.

In one exemplary embodiment, for example, the timing controller may be disposed on the printed circuit board 210.

In such an embodiment, the gate driver GIC1, GIC2 and GIC3 generates gate signals for driving the gate lines GLA and GLB in response to the first control signal received from the timing controller. In such an embodiment, the gate driver GIC1, GIC2 and GIC3 sequentially outputs the gate signals to the vertical gate line parts GLA.

In such an embodiment, the data driver DIC1, DIC2, DIC3 and DIC4 receives the second control signal and the data signal from the timing controller. The data driver DIC1, DIC2, DIC3 and DIC4 converts the data signal into data voltages having an analog type (i.e., analog data voltages). The data driver DIC1, DIC2, DIC3 and DIC4 outputs the data voltages to the data lines DL.

In an exemplary embodiment, as shown in FIG. 2, contact parts between the horizontal gate line parts GLUB (e.g., an upper horizontal gate line part GLUB) and the vertical gate line parts GLUA in the first side portion, e.g., the upper side portion, of the display panel 100 adjacent to the gate driver GIC1, GIC2 and GIC3 may be disposed or formed adjacent or closer to a first end of the first side portion of the display panel 100. In one exemplary embodiment, for example, the first end of the first side may be a left end of the first side portion of the display panel 100.

In such an embodiment, contact parts between the horizontal gate line parts GLMB (e.g., a middle horizontal gate line part GLMB) and the vertical gate line parts GLMA in a horizontal central portion of the display panel 100 may be disposed or formed adjacent to (or closer to) a central portion of the display panel 100. Herein, the horizontal central portion is a portion of the display panel 100 extending in a horizontal direction and between the first and side portions.

In such an embodiment, contact parts between the horizontal gate line parts GLLB (e.g., a lower horizontal gate line part GLLB) and the vertical gate line parts GLLA in a lower portion of the display panel 100 farther from the gate driver GIC1, GIC2 and GIC3 may be disposed or formed adjacent to (or closer to) a second end of a second side portion (e.g., a lower side portion) of the display panel 100. Here, the second side portion of the display panel 100 may be a side portion opposite to the first side portion. In one exemplary embodiment, for example, the second end of the second side may be a right end of the second side portion of the display panel 100.

As shown in FIG. 3, when the same gate signals are applied to all of the gate lines, the resistance-capacitance ("RC") delay may occur. FIG. 3 shows that the same gate signals are changed by the RC delays according to the positions thereof on the display panel 100.

In an upper left portion of the display panel 100, the RC delay of the vertical gate line part GLUA is very little and the RC delay of the horizontal gate line part GLUB is also very little. Thus, a waveform of the gate signal GS11 of the upper left portion of the display panel 100 is not substantially delayed nor distorted.

In an upper central portion of the display panel 100, the RC delay of the vertical gate line part GLUA may not occur or be very little and the RC delay of the horizontal gate line part GLUB substantially occurs. Thus, a waveform of the gate signal GS12 of the upper central portion of the display panel 100 is delayed compared to the waveform of the gate signal GS11 of the upper left portion of the display panel 100.

In an upper right portion of the display panel 100, the RC delay of the vertical gate line part GLUA is very little but the RC delay of the horizontal gate line part GLUB further occurs. Thus, a waveform of the gate signal GS13 of the upper right portion of the display panel 100 is further delayed compared to the waveform of the gate signal GS12 of the upper central portion of the display panel 100.

In a central portion of the display panel 100 in the vertical direction and in the horizontal direction, the RC delay of the vertical gate line part GLMA substantially occurs and the RC delay of the horizontal gate line part GLMB is very little. Thus, a waveform of the gate signal GS22 of the central portion of the display panel 100 in the vertical direction and in the horizontal direction is delayed compared to the waveform of the gate signal GS11 of the upper left portion of the display panel 100.

In a left portion of the horizontal central portion of the display panel 100, the RC delay of the vertical gate line part GLMA substantially occurs, and the RC delay of the horizontal gate line part GLMB substantially occurs. Thus, a waveform of the gate signal GS21 of the left portion of the horizontal central portion of the display panel 100 is delayed compared to the waveform of the gate signal GS22 of the central portion of the display panel 100 in the vertical direction and in the horizontal direction.

In a right portion of the horizontal central portion of the display panel 100, the RC delay of the vertical gate line part GLMA substantially occurs, and the RC delay of the horizontal gate line part GLMB substantially occurs. Thus, a waveform of the gate signal GS23 of the right portion of the horizontal central portion of the display panel 100 is delayed compared to the waveform of the gate signal GS22 of the central portion of the display panel 100 in the vertical direction and in the horizontal direction.

In a lower right portion of the display panel 100, the RC delay of the vertical gate line part GLLA further substantially occurs, but the RC delay of the horizontal gate line part GLLB is very little. Thus, a waveform of the gate signal GS33 of the lower right portion of the display panel 100 is further delayed compared to the waveform of the gate signal GS22 of the central portion of the display panel 100 in the vertical direction and in the horizontal direction.

In a lower central portion of the display panel 100, the RC delay of the vertical gate line part GLLA further substantially occurs, and the RC delay of the horizontal gate line part GLLB substantially occurs. Thus, a waveform of the gate signal GS32 of the lower central portion of the display panel 100 is further delayed compared to the waveform of the gate signal GS33 of the lower right portion of the display panel 100.

In a lower left portion of the display panel 100, the RC delay of the vertical gate line part GLLA is generated much and the RC delay of the horizontal gate line part GLLB further substantially occurs. Thus, a waveform of the gate signal GS31 of the lower left portion of the display panel 100 is further delayed compared to the waveform of the gate signal GS32 of the lower central portion of the display panel 100.

As described above, the RC delay of the gate signal varies according to the position thereof on the display panel 100 such that a display defect may occur due to charging rate, luminance, a degree of afterimage and a degree of flicker which vary according to the position thereof on the display panel 100.

Figure 4:
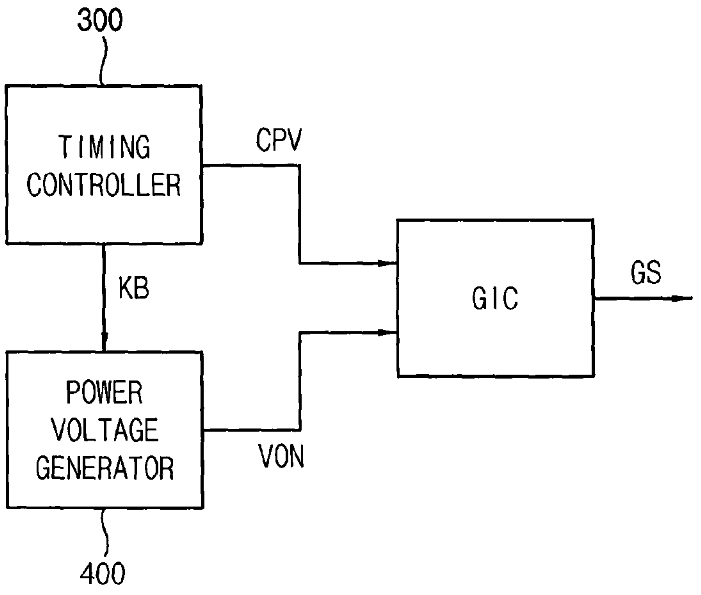
FIG. 4 is a block diagram illustrating a timing controller, a power voltage generator and a gate driver of an exemplary embodiment of the display apparatus shown in FIG. 1.
Figure 5:
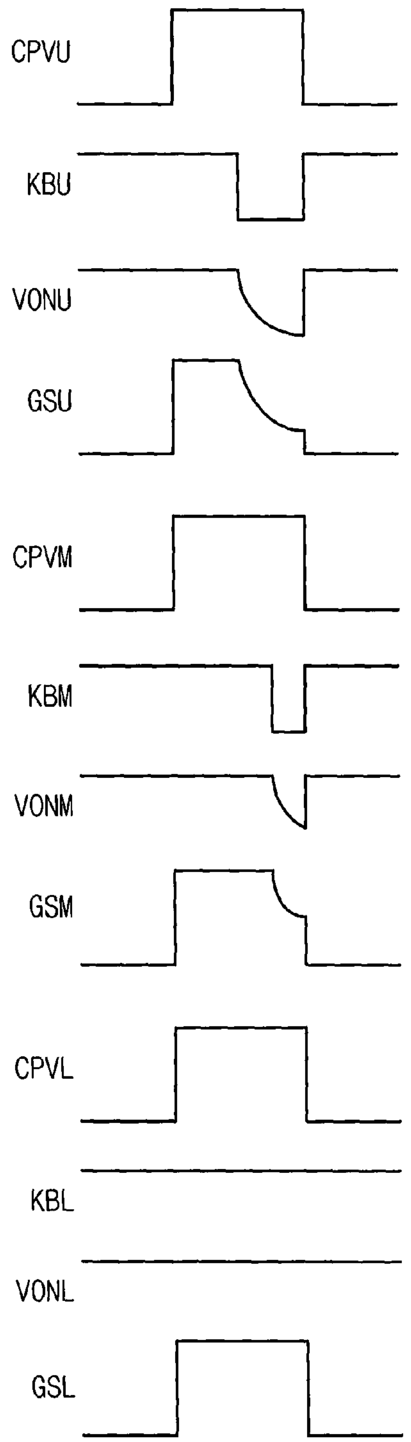
FIG. 5 is a waveform diagram illustrating input and output signals of the timing controller, the power voltage generator and the gate driver of an exemplary embodiment of the display apparatus shown in FIG. 1.

FIG. 4 is a block diagram illustrating the timing controller 300, a power voltage generator 400 and the gate driver GIC of an exemplary embodiment of the display apparatus shown in FIG. 1. FIG. 5 is a waveform diagram illustrating input and output signals of the timing controller 300, the power voltage generator 400 and the gate driver GIC of an exemplary embodiment of the display apparatus shown in FIG. 4.

Hereinafter, an exemplary embodiment of a method of adjusting a kickback slice to compensate the RC delay of the vertical gate line part will be described referring to FIGS. 4 and 5.

Referring to FIGS. 1 to 5, an exemplary embodiment of the display apparatus may further include the timing controller 300 and the power voltage generator 400.

The timing controller 300 may generate the gate clock signal CPV which defines the timing of the gate signals and a kickback signal KB which defines the kickback slice.

The power voltage generator 400 may generate a compensated gate-on voltage VON which includes a kickback slice component based on the kickback signal KB.

The gate driver GIC generates the gate signal GS based on the gate clock signal CPV received from the timing controller 300 and the compensated gate-on voltage VON received from the power voltage generator 400. The gate driver GIC outputs the gate signal GS to the gate lines GLA and GLB.

The kickback slice is defined as a portion having a level lower than a gate-on voltage level in a gate pulse of the gate signal GS.

When the gate signal GS suddenly decreases from the gate-on voltage level to a gate-off voltage level, a level of the pixel voltage charged at the pixel may thereby decrease such that the charging rate of the pixel may decrease. Thus, in an exemplary embodiment, the gate signal GS may have the kickback slice to effectively prevent the decrease of the charging rate. In such an embodiment, if all of the gate signal GS do not have the kickback slice, as referring to FIG. 3, non-uniformity of the luminance may occur due to the distorted or delayed waveforms of the gate signals which vary according to the positions thereof on the display panel 100 by the RC delay. Thus, in an exemplary embodiment, the gate signal GS may have the kickback slice to compensate the non-uniformity of the luminance.

In an exemplary embodiment, the gate signal applied to a position having a low RC delay of the gate line may have a kickback slice greater than a kickback slice of the gate signal applied to a position having a high RC delay.

In such an embodiment, the gate signal applied to the horizontal gate line part adjacent to (or closer to) the gate driver GIC in the display panel 100 may have a kickback slice greater than a kickback slice of the gate signal applied to the horizontal gate line part farther from the gate driver GIC.

In one exemplary embodiment, for example, the gate signal GSU applied to the horizontal gate line parts GLUB disposed adjacent to (or closer to) the gate driver GIC, e.g., at an upper side portion, in the display panel 100 has a relatively great kickback slice. In one exemplary embodiment, for example, the kickback signal KBU corresponding to the upper horizontal gate line part GLUB has a relatively long kickback active duration. In an exemplary embodiment, as shown in FIG. 5, the kickback signal is an active low signal so that the kickback active duration is defined as the duration when the kickback signal has a low level.

In one exemplary embodiment, for example, the gate signal GSM applied to the horizontal gate line parts GLMB disposed at the horizontal central portion in the display panel 100 has a kickback slice less than the gate signal GSU applied to the upper horizontal gate line part GLUB. In one exemplary embodiment, for example, the kickback signal KBM corresponding to the central horizontal gate line part GLMB has a kickback active duration shorter than the kickback signal KBU corresponding to the upper horizontal gate line part GLUB.

In one exemplary embodiment, for example, the gate signal GSL applied to the horizontal gate line parts GLLB disposed at the lower portion in the display panel 100 has a kickback slice less than the gate signal GSM applied to the central horizontal gate line part GLMB. In one exemplary embodiment, for example, the kickback signal KBL corresponding to the lower horizontal gate line part GLLB has a kickback active duration shorter than the kickback signal KBM corresponding to the central horizontal gate line part GLMB. In an exemplary embodiment, as shown in FIG. 5, the kickback signal KBL corresponding to the lower horizontal gate line part GLLB does not have the kickback active duration.

The power voltage generator 400 transmits a gate-on voltage defining a high level of the gate signal GS to the gate driver GIC. In an exemplary embodiment, the power voltage generator 400 may transmit the compensated gate-on voltage reflecting (e.g., compensated based on) the kickback slice corresponding to the kickback active duration of the kickback signal.

The gate driver GIC generates the gate signal GS using the compensated gate-on voltage reflecting the kickback slice.

In one exemplary embodiment, for example, the kickback active duration of the kickback signal is increased to increase the kickback slice. Alternatively, the drop of the gate-on voltage level may be increased without adjusting the kickback active duration to increase the kickback slice.

Figure 6:
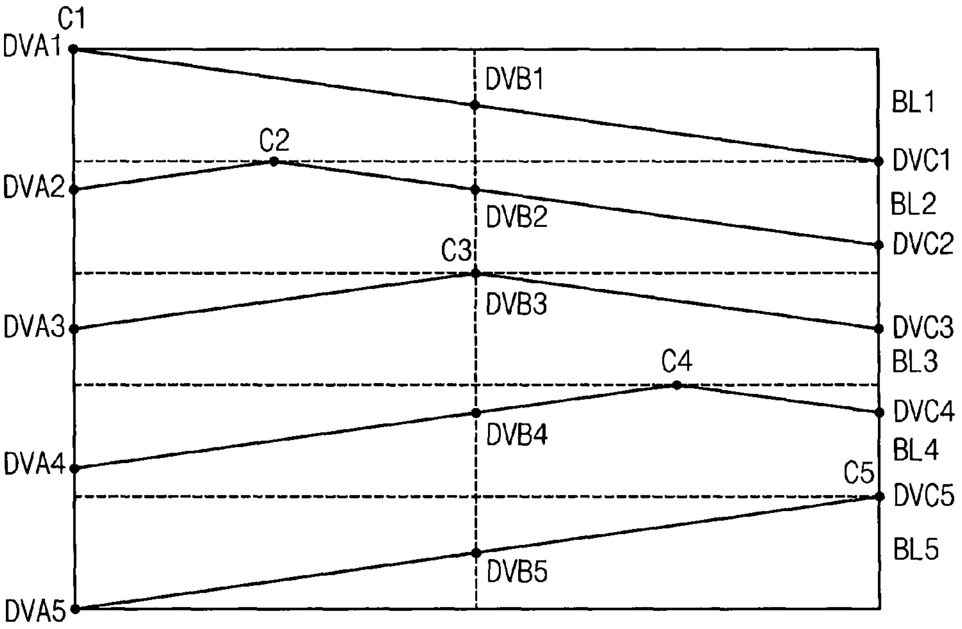
FIG. 6 is a conceptual diagram illustrating resistance-capacitance ("RC") delay of the gate line according to the position thereof on the display panel of FIG. 1.
Figure 7A:
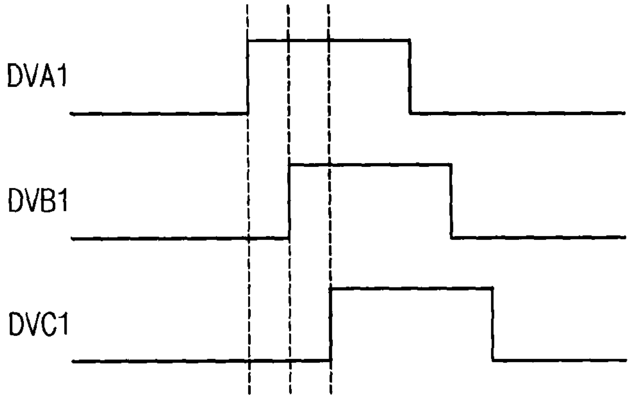
FIG. 7A is a waveform diagram illustrating a source shift of a data voltage in a first block of the display panel of FIG. 6.
Figure 7B:
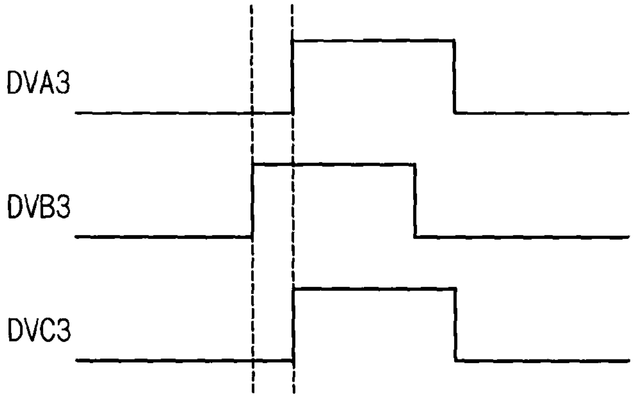
FIG. 7B is a waveform diagram illustrating the source shift of the data voltage in a third block of the display panel of FIG. 6.
Figure 7C:
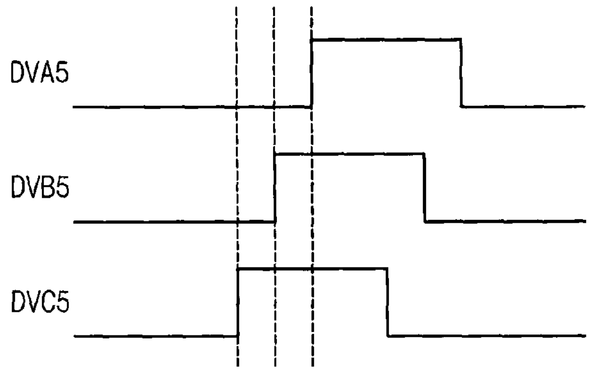
FIG. 7C is a waveform diagram illustrating the source shift of the data voltage in a fifth block of the display panel of FIG. 6.
Figure 8A:
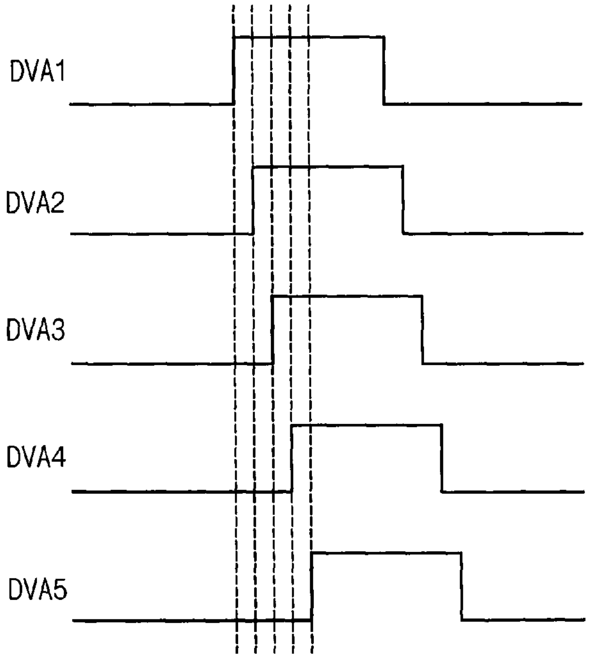
FIG. 8A is a waveform diagram illustrating the source shift of the data voltage of a first data line of the display panel of FIG. 6.
Figure 8B:
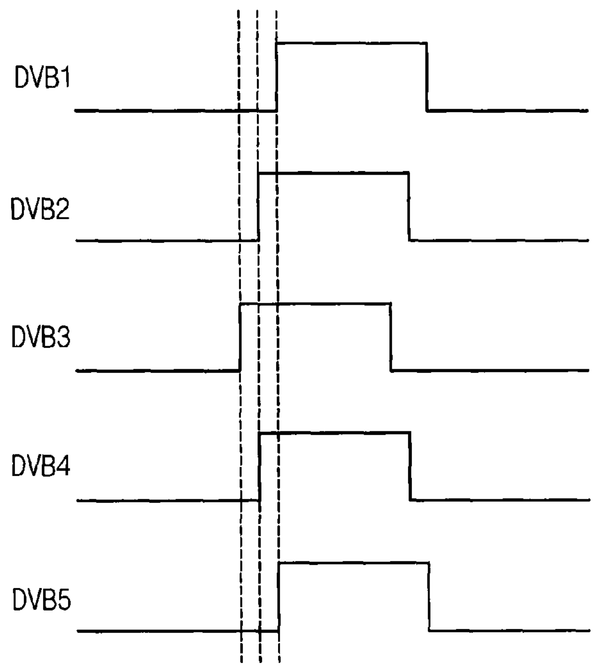
FIG. 8B is a waveform diagram illustrating the source shift of the data voltage of a medium data line of the display panel of FIG. 6.
Figure 8C:
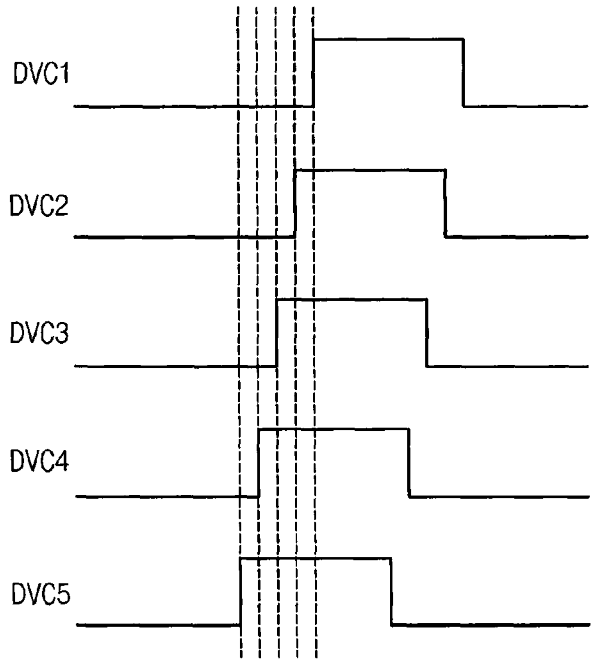
FIG. 8C is a waveform diagram illustrating the source shift of the data voltage of a last data line of the display panel of FIG. 6.

FIG. 6 is a conceptual diagram illustrating RC delay of the gate line according to the position thereof on the display panel 100 of FIG. 1. FIG. 7A is a waveform diagram illustrating a source shift of a data voltage in a first block BL1 of the display panel 100 of FIG. 6. FIG. 7B is a waveform diagram illustrating the source shift of the data voltage in a third block BL3 of the display panel 100 of FIG. 6. FIG. 7C is a waveform diagram illustrating the source shift of the data voltage in a fifth block BL5 of the display panel 100 of FIG. 6. FIG. 8A is a waveform diagram illustrating the source shift of the data voltage of a first data line of the display panel 100 of FIG. 6. FIG. 8B is a waveform diagram illustrating the source shift of the data voltage of a middle data line of the display panel 100 of FIG. 6. FIG. 8C is a waveform diagram illustrating the source shift of the data voltage of a last data line of the display panel 100 of FIG. 6.

Hereinafter, an exemplary embodiment of a method of the source shift of the data voltage to compensate the RC delay of the horizontal gate line part referring to FIGS. 6 to 8C.

In an exemplary embodiment, the display panel 100 may be divided into a plurality of blocks in the vertical direction. Hereinafter, an exemplary embodiment, where the plurality of blocks includes five blocks BL1, BL2, BL3, BL4 and BL5 as shown in FIG. 6, will be described in detail for convenience of description.

Referring to FIGS. 1 to 6, the data voltage applied to a position having the high RC delay of the gate line has a great source shift. The source shift is defined as a time interval to delay to output the data voltage, when the data voltage is outputted from the data driver DIC. The source shift may include a first shift to compensate the delay between the data driving chips and a second shift to compensate the delay between the data lines.

In the upper portion (e.g. a first block BL1) of the display panel 100 adjacent to (or closer to) the gate driver GIC, the contact part (e.g. C1) between the horizontal gate line part and the vertical gate line part is formed adjacent to (or closer to) the first end (e.g., the left end) of the first side portion (e.g., the upper side portion) of the display panel 100.

In the horizontal central portion (e.g. a third block BL3) of the display panel 100, the contact part (e.g. C3) between the horizontal gate line part and the vertical gate line part is formed at a middle of the horizontal central portion of the display panel 100.

In the lower portion (e.g. a fifth block BL5) of the display panel 100 farther from the gate driver GIC, the contact part (e.g. C5) between the horizontal gate line part and the vertical gate line part is formed adjacent to (or closer to) the second end (e.g., the right end) of the second side portion (e.g., the lower side portion) of the display panel 100.

In such an embodiment, as the distance of a position, to which the data voltage is applied, from the contact part between the horizontal gate line part and the vertical gate line part increases, the RC delay of the horizontal gate line part increases.

In one exemplary embodiment, for example, in the first block BL1, the contact part C1 is disposed at the first end portion of the first side portion of the display panel 100 such that the RC delay of the horizontal gate line part increases from the first end of the first side to the second end of the first side.

In an exemplary embodiment, as shown in FIG. 7A, the data voltage DVB1 applied to the middle of the first side portion of the display panel 100 has a source shift greater than a source shift of the data voltage DVA1 applied to the first end of the first side portion of the display panel 100. The data voltage DVC1 applied to the second end of the first side portion of the display panel 100 has a source shift greater than the source shift of the data voltage DVB1 applied to the middle of the first side portion of the display panel 100.

In one exemplary embodiment, for example, in the third block BL3, the contact part C3 is disposed at or near a middle of the horizontal central portion, between the first and second ends of the central portion, of the display panel 100, such that the RC delay of the horizontal gate line part increases and decreases from the first end of the horizontal central portion to the second end of the horizontal central portion.

In an exemplary embodiment, as shown in FIG. 7B, the data voltage DVA3 applied to the first end of the horizontal central portion of the display panel 100 has a source shift greater than a source shift of the data voltage DVB3 applied to the middle of the horizontal central portion of the display panel 100. The data voltage DVC3 applied to the second end of the horizontal central portion of the display panel 100 has a source shift greater than a source shift of the data voltage DVB3 applied to the middle portion of the horizontal central portion of the display panel 100.

In one exemplary embodiment, for example, in the fifth block BL5, the contact part C5 is disposed at or near the second end of the second side portion of the display panel 100 such that the RC delay of the horizontal gate line part decreases from the first end of the first side to the second end of the first side.

In an exemplary embodiment, as shown in FIG. 7C, the data voltage DVB5 applied to the middle of the second side portion of the display panel 100 has a source shift greater than a source shift of the data voltage DVC5 applied to the second end of the second side portion of the display panel 100. The data voltage DVA5 applied to the first end of the second side portion of the display panel 100 has a source shift greater than the source shift of the data voltage DVB5 applied to a middle of the second side portion of the display panel 100.

In an exemplary embodiment, as shown in FIG. 6, in the first end portion (e.g., the left end portion) of the display panel 100, the RC delay increases from the upper portion to the lower portion. Accordingly, in such an embodiment, t the output timings of the data voltages DVA1, DVA2, DVA3, DVA4 and DVA5 are gradually delayed from the upper portion to the lower portion. Herein, the first end portion means a portion extending along the first end (e.g., left end) of the display panel 100.

In an exemplary embodiment, as shown in FIG. 8A, the source shifts of the data voltages DVA1, DVA2, DVA3, DVA4 and DVA5 applied to the first data line adjacent to (or closer to) the first end of the display panel 100 increase from the upper portion to the lower portion.

In an exemplary embodiment, as shown in FIG. 6, in the vertical central portion of the display panel 100, the RC delay decreases and increases from the upper portion to the lower portion such that the output timings of the data voltages DVB1, DVB2, DVB3, DVB4 and DVB5 are gradually got earlier and then delayed from the upper portion to the lower portion. Herein, the vertical central portion means a central portion of the display panel extending in a vertical direction, and disposed between the first and second end portions.

In an exemplary embodiment, as shown in FIG. 8B, the source shifts of the data voltages DVB1, DVB2, DVB3, DVB4 and DVB5 applied to the data line adjacent to (or closer to) the vertical central portion of the display panel 100 decrease and increase from the upper portion to the lower portion.

In an exemplary embodiment, as shown in FIG. 6, in the second end portion (e.g., the right end portion) of the display panel 100, the RC delay decreases from the upper portion to the lower portion. Accordingly, in such an embodiment, the output timings of the data voltages DVC1, DVC2, DVC3, DVC4 and DVC5 are gradually got earlier from the upper portion to the lower portion.

In an exemplary embodiment, as shown in FIG. 8C, the source shifts of the data voltages DVC1, DVC2, DVC3, DVC4 and DVC5 applied to the last data line adjacent to (or closer to) the second end of the first side of the display panel 100 decrease from the upper portion to the lower portion.

According to an exemplary embodiment, as described above, the kickback slice of the gate signal and the source shift of the data voltage are adjusted according to the position thereof on the display panel 100 so that the charging rate, the luminance, the degree of the afterimage, the degree of the flicker which vary according to the position thereof on the display panel 100 may be compensated. Thus, in such an embodiment, the display quality of the display apparatus having slim bezel may be improved.

Figure 9:
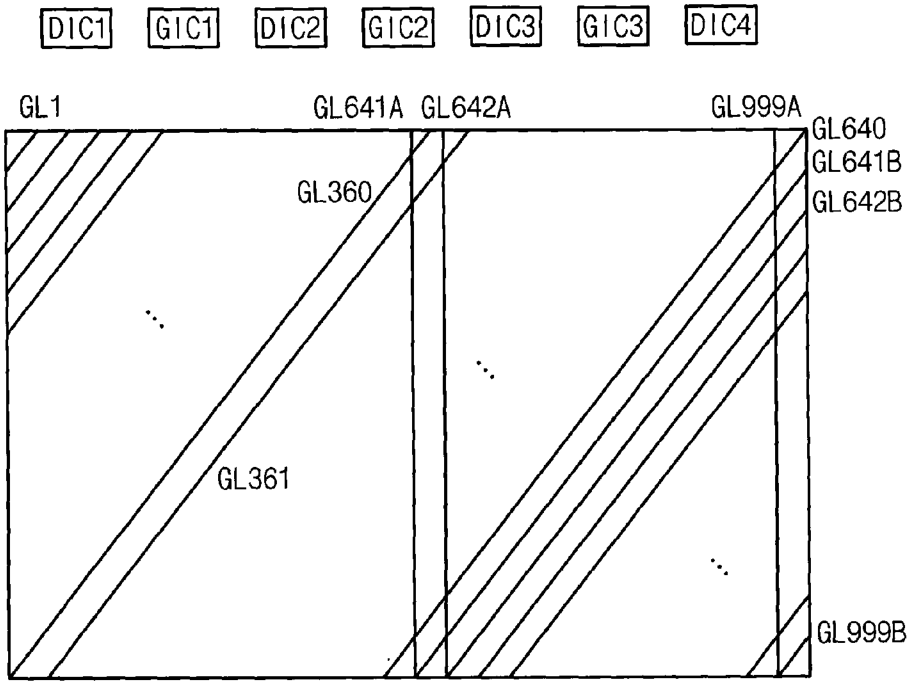
FIG. 9 is a conceptual diagram illustrating an exemplary embodiment of a display panel and gate lines thereon, according to the invention.
Figure 10:
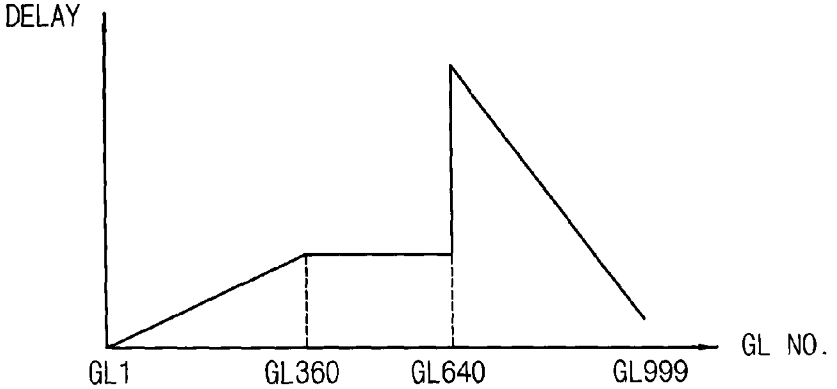
FIG. 10 is a conceptual diagram illustrating RC delay of the gate line according to the position thereof on the display panel of FIG. 9.
Figure 11:
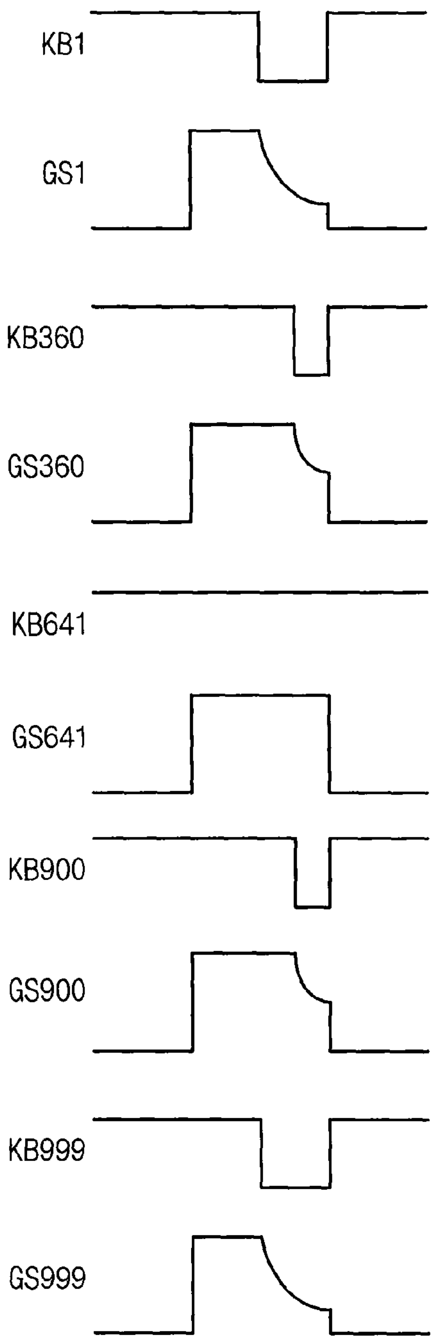
FIG. 11 is a waveform diagram illustrating a kickback signal applied to a gate driver of FIG. 9 and a gate signal output from the gate driver of FIG. 9.

FIG. 9 is a conceptual diagram illustrating a display panel and gate lines on an alternative exemplary embodiment of the display panel according to the invention. FIG. 10 is a conceptual diagram illustrating RC delay of the gate line according to the position thereof on the display panel of FIG. 9. FIG. 11 is a waveform diagram illustrating a kickback signal applied to a gate driver of FIG. 9 and a gate signal output from the gate driver of FIG. 9.

Referring to FIGS. 1 and 9 to 11, an exemplary embodiment of the display apparatus includes a display panel 100 and a display panel driver.

The display panel driver includes a gate driver GIC1, GIC2 and GIC3, and a data driver DIC1, DIC2, DIC3 and DIC4. The gate driver GIC1, GIC2 and GIC3 is disposed adjacent to (or closer to) a first side (e.g., an upper side) of the display panel 100. The data driver DIC1, DIC2, DIC3 and DIC4 is disposed adjacent to (or closer to) the first side of the display panel 100.

The display panel 100 includes a plurality of gate lines, a plurality of data lines, and a plurality of pixels electrically connected to the gate lines and the data lines.

Each pixel includes a switching element (not shown), a liquid crystal capacitor (not shown) and a storage capacitor (not shown). The liquid crystal capacitor and the storage capacitor are electrically connected to the switching element. The pixels may be disposed substantially in a matrix form.

In an exemplary embodiment, the gate lines of the display panel 100 may be divided into first to third gate line groups.

Gate lines of the first gate line group extend substantially in an inclined direction from the first side of the display panel 100. Herein, the inclined direction means a direction different from the vertical direction and the horizontal direction. Ends of the gate lines of the first gate line group are sequentially disposed from the first end of the first side to the second end of the first side. The gate lines of the first gate line group cover a first area (BLA and BLB in FIG. 12) of the display panel 100. The gate lines of the first gate line group are connected (e.g., directly connected) to the gate driver GIC1, GIC2 and GIC3. Herein, "directly connected" may mean "connected without being through another gate line or any other line." In one exemplary embodiment, for example, extending in the inclined direction may mean extending generally in the inclined direction in a step shape.

In one exemplary embodiment, for example, the first gate line group may include gate lines GL1 to GL360. The gate lines GL1 to GL360 extend from the first side of the display panel 100 to a fourth side (e.g., a left side) of the display panel 100 which is perpendicular to the first side of the display panel 100 in the inclined direction. The gate lines GL1 to GL360 may cover an area BLA in FIG. 12 in the first area.

In one exemplary embodiment, for example, the first gate line group may further include gate lines GL361 to GL640. The gate lines GL361 to GL640 extend from the first side of the display panel 100 to a third side of the display panel 100 which faces the first side of the display panel 100 in the inclined direction. The gate lines GL361 to GL640 may cover an area BLB in FIG. 12 in the first area.

Gate lines of the second gate line groups cover a second area (BLC in FIG. 11) of the display panel 100 which is not covered by the gate lines of the first gate line group. The gate lines of the second gate line group may extend in a direction parallel to the extending direction of the first gate line group.

The gate lines of the second gate line group extend from a second side (e.g., a right side) of the display panel 100, which is perpendicular to the first side of the display panel 100 and faces the fourth side of the display panel 100, to the third side of the display panel 100 in the inclined direction. In one exemplary embodiment, for example, the second gate line group may include gate lines GL641B to GL999B.

Gate lines of the third gate line group connect the gate lines of the second gate line group to the gate driver. The gate lines of the third gate line group may extend from the first side to the third side of the display panel 100 in the vertical direction. In one exemplary embodiment, for example, the third gate line group includes gate lines GL641A to GL999A.

In an exemplary embodiment, the numbers (e.g. 360, 640 and 999) of the gate lines are selected for convenience of description, the invention is not limited to the numbers of the gate lines.

In an exemplary embodiment, as shown in FIG. 10, from the first gate line GL1 to the 360-th gate line GL360, lengths of the gate lines gradually increase so that the RC delays of the gate lines gradually increase.

From the 361-th gate line GL361 to the 640-th gate line GL640, lengths of the gate lines are uniform, that is, substantially the same as each other, so that the RC delays of the gate lines are substantially uniform.

The 641-th gate line (GL641A and GL641B) has a connecting structure of an inclined gate line GL641B and a vertical gate line GL641A to cover the second area (BLC in FIG. 11) which is not covered by the gate lines of the first gate line group. Thus, from the 641-th gate line (GL641A and GL641B), the length of the gate line substantially increases compared to the 361-th gate line GL361 to the 640-th gate line GL640 so that the RC delay of the gate line discontinuously increases from to the 641-th gate line (GL641A and GL641B).

From the 641-th gate line GL641A and GL641B to the 999-th gate line GL999A and GL999B, lengths of the gate lines gradually decrease so that the RC delays of the gate lines gradually decrease.

In an exemplary embodiment, the gate signal applied to a position having a low RC delay of the gate line may have a kickback slice greater than a kickback slice of the gate signal applied to a position having a high RC delay.

Thus, the kickback slice of the gate signal applied to the first area through the gate lines GL1 to GL360 of the first gate line group decreases according to positions of ends of the gate lines GL1 to GL360 of the first gate line group, near or on the first side, from the first end of the first side of the display panel 100 to the second end of the first side of the display panel 100, for example, from the gate line GL1 to the gate line GL360.

Thus, the kickback slice of the gate signal applied to the second area through the gate lines GL641A to GL999A of the third gate line group and the gate lines GL641B to GL999B of the second gate line group increases according to positions of ends of the gate lines GL641A to GL999A of the third gate line group, near or on the first side, from the first end of the first side of the display panel 100 to the second end of the first side of the display panel 100, for example, from the gate lines GL641A and GL641B to the gate lines GL999A and GL999B.

Hereinafter, an exemplary embodiment of a method of adjusting a kickback slice to compensate the RC delay of the gate line will be described in detail referring to FIGS. 10 and 11.

Referring to FIG. 11, the gate signal GS1 applied to the first gate line GL1 of the first gate line group has a relatively great kickback slice. In one exemplary embodiment, for example, the kickback signal KB1 corresponding to the first gate line GL1 has a relatively long kickback active duration. In an exemplary embodiment, as shown in FIG. 11, the kickback signal is an active low signal so that the kickback active duration is defined as the duration when the kickback signal has a low level.

The gate signal GS360 applied to the 360-th gate line GL360 of the first gate line group has a kickback slice less than the gate signal GS1 applied to the first gate line GL1. In one exemplary embodiment, for example, the kickback signal KB360 corresponding to the 360-th gate line GL360 has a kickback active duration shorter than the kickback signal KB1 corresponding to the first gate line GL1.

The gate signal GS641 applied to the 641-th gate line GL641A and GL641B of the second and third gate line groups has a kickback slice less than the gate signal GS360 applied to the 360-th gate line GL360. In one exemplary embodiment, for example, the kickback signal KB641 corresponding to the 641-th gate line GL641A and GL641B has a kickback active duration shorter than the kickback signal KB360 corresponding to the 360-th gate line GL360. In one exemplary embodiment, for example, the kickback signal KB641 corresponding to the 641-th gate line GL641A and GL641B does not have the kickback active duration, as shown in FIG. 11.

The gate signal GS900 applied to the 900-th gate line GL900A and GL900B of the second and third gate line groups has a kickback slice greater than the gate signal GS641 applied to the 641-th gate line GL641A and GL641B. In one exemplary embodiment, for example, the kickback signal KB900 corresponding to the 900-th gate line GL900A and GL900B has a kickback active duration longer than the kickback signal KB641 corresponding to the 641-th gate line GL641A and GL641B.

The gate signal GS999 applied to the last gate line GL999A and GL999B of the second and third gate line groups has a kickback slice greater than the gate signal GS900 applied to the 900-th gate line GL900A and GL900B. In one exemplary embodiment, for example, the kickback signal KB999 corresponding to the last gate line GL999A and GL999B has a kickback active duration longer than the kickback signal KB900 corresponding to the 900-th gate line GL900A and GL900B.

In one exemplary embodiment, for example, the kickback active duration of the kickback signal is increased to increase the kickback slice. Alternatively, the drop of the gate-on voltage level is increased without adjusting the kickback active duration to increase the kickback slice.

Figure 12:
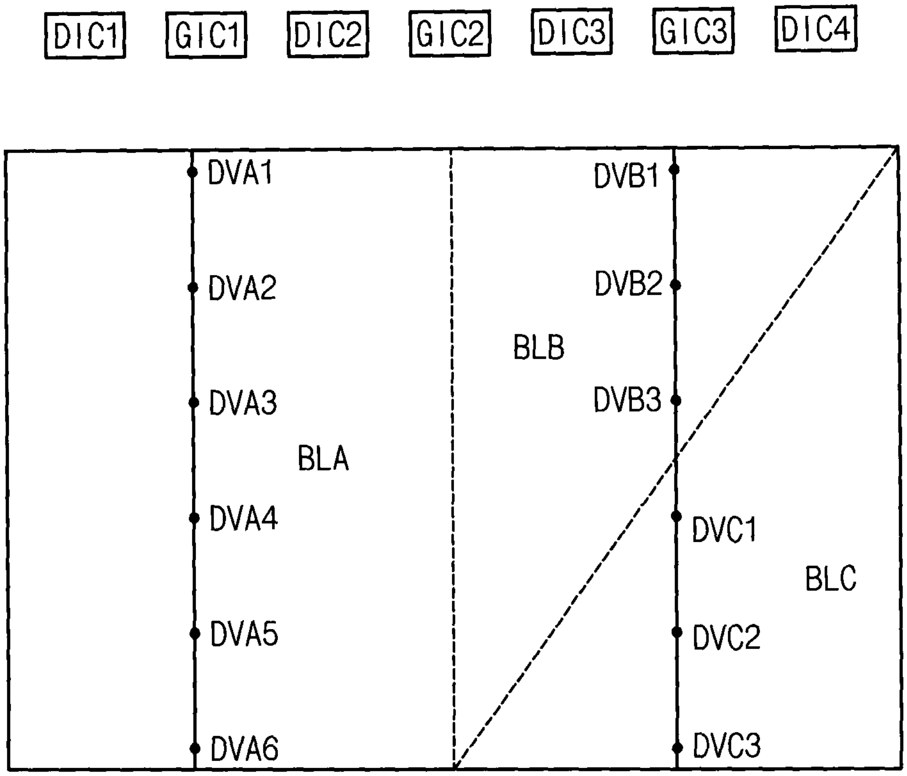
FIG. 12 is a conceptual diagram illustrating the source shift according to the position thereof on the display panel of FIG. 9.
Figure 13A:
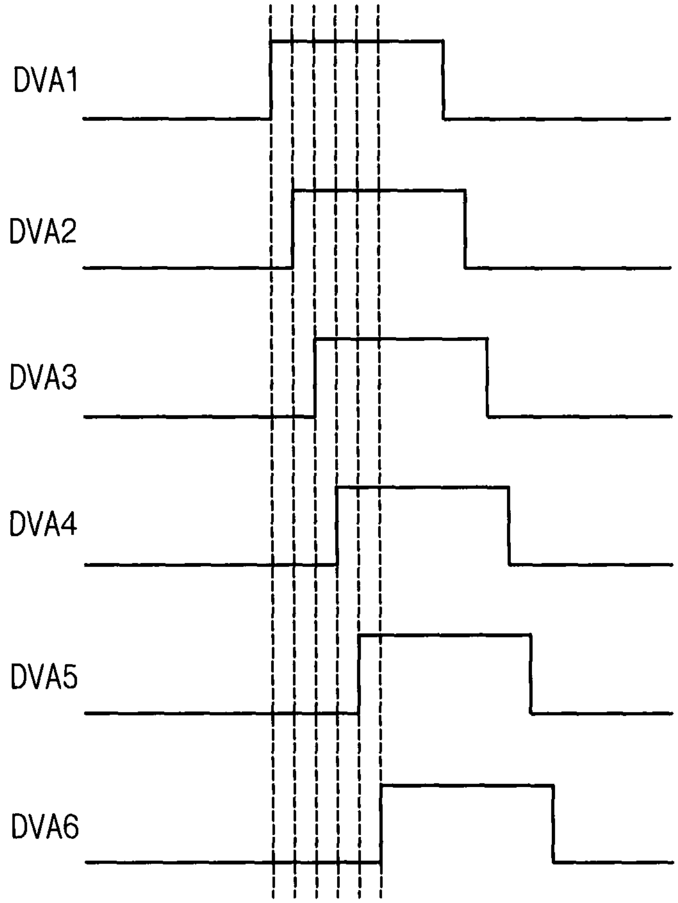
FIG. 13A is a waveform diagram illustrating the source shift of a first area of the display panel of FIG. 9.
Figure 13B:
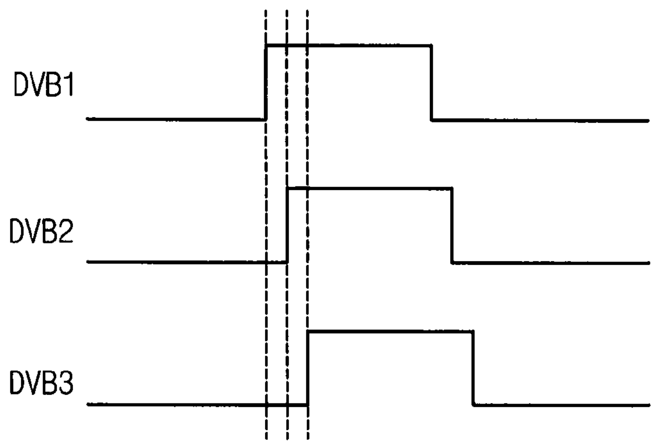
FIGS. 13B and 13C are waveform diagrams illustrating the source shift of the first area and a second area of the display panel of FIG. 9.
Figure 13C:
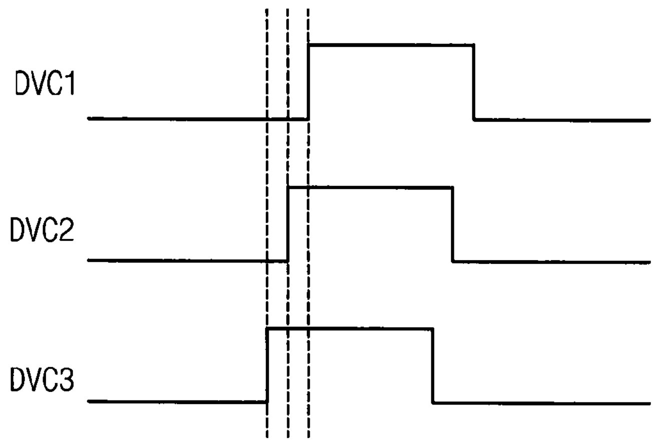

FIG. 12 is a conceptual diagram illustrating the source shift according to the position thereof on the display panel 100 of FIG. 9. FIG. 13A is a waveform diagram illustrating the source shift of the first area of the display panel 100 of FIG. 9. FIGS. 13B and 13C are waveform diagrams illustrating the source shift of the first area and the second area of the display panel 100 of FIG. 9.

Hereinafter, an exemplary embodiment of a method of the source shift of the data voltage to compensate the RC delay of the gate line will be described in detail referring to FIGS. 12 to 13C.

Referring to FIGS. 9 to 13C, the data voltage applied to a position having the high RC delay of the gate line has a great source shift.

In one exemplary embodiment, for example, in a viewpoint of the data line which is adjacent to (or closer to) the first end of the first side of the display panel 100 and passes through only the first area (e.g., BLA among BLA and BLB), the gate lines disposed at the upper portion of the display panel 100 has a relatively low RC delay but the gate lines disposed at the lower portion of the display panel 100 has a relatively high RC delay.

In an exemplary embodiment, as shown in FIG. 13A, the source shifts of the data voltages DVA1, DVA2, DVA3, DVA4, DVA5 and DVA6 applied to the data line which is adjacent to (or closer to) the first end of the first side portion of the display panel 100 and passes through only the first area (e.g., BLA) increase from the upper portion of the display panel 100 to the lower portion of the display panel 100.

In one exemplary embodiment, for example, in a viewpoint of the data line which is adjacent to (or closer to) the second end of the first side portion of the display panel 100 and passes through the first area (e.g., BLB) and the second area BLC, the RC delays of the gate lines corresponding to the first area BLB of the display panel 100 increase from the upper portion to the lower portion and the RC delays of the gate lines corresponding to the second area BLC of the display panel 100 decrease from the upper portion to the lower portion.

In an exemplary embodiment, as shown in FIG. 13B, the source shifts of the data voltages DVB1, DVB2 and DVB3 corresponding to the first area BLB among the data voltages applied to the data line which is adjacent to (or closer to) the second end of the first side of the display panel 100 and passes through the first area BLB and the second area BLC increase from the upper portion of the display panel 100 to the lower portion of the display panel 100.

In an exemplary embodiment, as shown in FIG. 13C, the source shifts of the data voltages DVC1, DVC2 and DVC3 corresponding to the second area BLC among the data voltages applied to the data line which is adjacent to (or closer to) the second end of the first side of the display panel 100 and passes through the first area BLB and the second area BLC decrease from the upper portion of the display panel 100 to the lower portion of the display panel 100.

According to an exemplary embodiment, the kickback slice of the gate signal and the source shift of the data voltage are adjusted according to the position hereof on the display panel 100 so that the charging rate, the luminance, the degree of the afterimage, the degree of the flicker which vary according to the position thereof on the display panel 100 may be compensated. Thus, in such an embodiment, the display quality of the display apparatus having slim bezel may be improved.

According to exemplary embodiments of the invention, as described above, the width of the bezel of the display apparatus may be decreased and the display quality may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:

a display panel comprising a plurality of gate lines, a plurality of data lines and a plurality of pixels electrically connected to the gate lines and the data lines, wherein the display panel displays an image;

a gate driver disposed adjacent to a first side of the display panel, wherein the gate driver outputs a gate signal to the gate lines; and a data driver disposed adjacent to the first side of the display panel, wherein the data driver outputs a data voltage to the data lines, wherein the gate signal applied to a position having a low resistance-capacitance delay of the gate lines has a kickback slice greater than a kickback slice of the gate signal applied to a position having a high resistance-capacitance delay of the gate lines, and wherein the kickback slice is defined as a portion having a level lower than a gate-on voltage level in a gate pulse of the gate signal.

2. The display apparatus of claim 1, wherein the gate lines comprise:

a horizontal gate line part; and a vertical gate line part connecting the horizontal gate line part to the gate driver.

3. The display apparatus of claim 2, wherein the gate signal applied to the horizontal gate line part which is disposed closer to the gate driver in the display panel has the kickback slice greater than the kickback slice of the gate signal applied to the horizontal gate line part which is farther from the gate driver.

4. The display apparatus of claim 1, wherein the gate lines comprise:

gate lines of a first gate line group extending in an inclined direction from the first side of the display panel, wherein the inclined direction is a direction different from a vertical direction and a horizontal direction, the gate lines of the first gate line group are disposed sequentially from a first end of the first side to a second end of the first side, the gate lines of the first gate line group cover a first area of the display panel, and the gate lines of the first gate line group are connected to the gate driver, and gate lines of a second gate line group extending in the inclined direction from a second side of the display panel, wherein the second side is connected to the first side, and the gate lines of the second gate line group cover a second area of the display panel which is not covered by the gate lines of the first gate line group; and gate lines of a third gate line group connecting the gate lines of the second gate line group to the gate driver.

5. The display apparatus of claim 4, wherein the gate lines of the first gate line group comprise:

gate lines extending from the first side to a third side, which is opposite to the first side; and gate lines extending from the first side to a fourth side, which is opposite to the second side and connected to the first end of the first side;

wherein kickback slices of gate signals applied to the first area through the gate lines extending from the first side to the fourth side decrease according to positions of ends the gate lines extending from the first side to the fourth side on the first side from the first end to the second end.

6. The display apparatus of claim 5, wherein the second side is connected to the second end of the first side, and kickback slices of gate signals applied to the second area through the gate lines of the third gate line group and the gate lines of the second gate line group increase according to positions of ends of the gate lines of the third gate line group on the first side from the first end to the second end.

7. The display apparatus of claim 1, further comprising:

a timing controller which generates a gate clock signal defining a timing of the gate signal and a kickback signal defining the kickback slice; and a power voltage generator which generates a compensated gate-on voltage based on the kickback signal, wherein the compensated gate-on voltage comprises a kickback slice component, wherein the gate driver which generates the gate signal based on the gate clock signal and the compensated gate-on voltage.

8. The display apparatus of claim 1, wherein the data voltage applied to a position having a relatively high resistance-capacitance delay of the gate line has a relatively great source shift, and the source shift is defined as a time interval to delay to output the data voltage, when the data voltage is outputted from the data driver.

9. The display apparatus of claim 8, wherein the gate line comprises:

a horizontal gate line part; and a vertical gate line part connecting the horizontal gate line part to the gate driver.

10. The display apparatus of claim 9, wherein the source shift of the data voltage increases in a horizontal direction of the display panel as a distance of a position, to which the data voltage is applied, from a contact part between the horizontal gate line part and the vertical gate line part increases.

11. The display apparatus of claim 9, wherein the horizontal gate line part comprises:

an upper horizontal gate line in an upper portion of the display panel adjacent to the gate driver;

a middle horizontal gate line in a horizontal central portion of the display panel; and a lower horizontal gate line in a lower portion of the display panel display, wherein a contact part between the upper horizontal gate line part and the vertical gate line part is disposed closer to a first end of the first side of the display panel, a contact part between the middle horizontal gate line part and the vertical gate line part is disposed in in a vertical central portion of the display panel extending from a central portion of the first side, and a contact part between the lower horizontal gate line part and the vertical gate line part is disposed closer to a second end of the first side.

12. The display apparatus of claim 11, wherein the source shift of the data voltage applied to a first data line of the data lines adjacent to the first end of the first side increases from the upper portion to the lower portion of the display panel, the source shift of the data voltage applied to a central data line of the data lines adjacent to the central portion of the first side decreases and increases from the upper portion to the lower portion of the display panel, and the source shift of the data voltage applied to a last data line of the data lines adjacent to the second end of the first side decreases from the upper portion to the lower portion of the display panel.

13. The display apparatus of claim 8, wherein the gate lines comprises:

gate lines of a first gate line group extending in an inclined direction from the first side of the display panel, wherein the inclined direction is a direction different from a vertical direction and a horizontal direction, the gate lines of the first gate line group are disposed sequentially from a first end of the first side to a second end of the first side, the gate lines of the first gate line group cover a first area of the display panel, and the gate lines of the first gate line connected to the gate driver;

gate lines of a second gate line group extending in the inclined direction from a second side of the display panel, wherein the second side is connected to the first side, and the gate lines of the second gate line group cover a second area of the display panel which is not covered by the gate lines of the first gate line group; and gate lines of a third gate line group connecting the gate lines of the second gate line group to the gate driver.

14. The display apparatus of claim 13, wherein the source shifts of the data voltages applied to a data line closer to the first end of the first side of the display panel and passes through only the first area increase from an upper portion of the display panel to a lower portion of the display panel.

15. The display apparatus of claim 13, wherein the source shifts of the data voltages applied to a data line closer to the second end of the first side of the display panel and passes through the first area and the second area increase and decrease from an upper portion of the display panel to a lower portion of the display panel.

16. A method of driving a display panel, the method comprising:

outputting a gate signal to a gate line using a gate driver, wherein the gate driver is disposed adjacent to a first side of the display panel, the display panel comprises a plurality of the gate lines, a plurality of data lines and a plurality of pixels electrically connected to the gate lines and the data lines; and outputting a data voltage to the data line using a data driver, wherein the data driver is disposed adjacent to the first side of the display panel, wherein the gate signal applied to a position having a low resistance-capacitance delay of the gate line has a kickback slice greater than a kickback slice of the gate signal applied to a position having a high resistance-capacitance delay, and wherein the kickback slice is defined as a portion having a level lower than a gate-on voltage level in a gate pulse of the gate signal.

17. The method of claim 16, wherein the gate lines comprise:

a horizontal gate line part; and a vertical gate line part connecting the horizontal gate line part to the gate driver.

18. The method of claim 17, wherein the gate signal applied to the horizontal gate line part which is disposed closer to the gate driver in the display panel has the kickback slice greater than the kickback slice of the gate signal applied to the horizontal gate line part which is farther from the gate driver.

19. The method of claim 16, wherein the data voltage applied to a position having a relatively high resistance-capacitance delay of the gate line has a relatively great source shift, and the source shift is defined as a time interval to delay to output the data voltage, when the data voltage is outputted from the data driver.

* * * * *